United States Patent [19]

Herz

[11] E Patent Number: Re. 32,195

[45] **Reissued Date of Patent: * Jul. 1, 1986**

[54] SILVER HALIDE EMULSIONS CONTAINING AROMATIC LATENT IMAGE STABILIZING COMPOUNDS

[75] Inventor: Arthur H. Herz, Rochester, N.Y.

[73] Assignee: Eastman Kodak Company, Rochester, N.Y.

[ * ] Notice: The portion of the term of this patent subsequent to Feb. 15, 2000 has been disclaimed.

[21] Appl. No.: 719,840

[22] Filed: Apr. 4, 1985

Related U.S. Patent Documents

Reissue of:

[64] Patent No.: 4,423,140
Issued: Dec. 27, 1983
Appl. No.: 392,043
Filed: Apr. 4, 1985

[51] Int. Cl.[4] ..... G03C 1/34

[52] U.S. Cl. ..... 430/445; 430/447; 430/448; 430/607; 430/611; 430/612; 430/505; 430/551

[58] Field of Search ..... 430/445, 447, 448, 607, 430/611, 612, 505, 551

[56] References Cited

U.S. PATENT DOCUMENTS

| | | | |
|---|---|---|---|
| Re. 28,668 | 12/1975 | Herz | 430/607 |
| 2,131,038 | 9/1938 | Brooker et al. | 430/614 |
| 3,732,103 | 5/1973 | Herz | 430/611 |
| 3,954,478 | 5/1976 | Arai et al. | 430/551 |
| 4,374,196 | 2/1983 | Herz | 430/505 |

FOREIGN PATENT DOCUMENTS 522997 7/1940 United Kingdom .

OTHER PUBLICATIONS

Mills et al., J. Chem. Soc., 123, 2353–2362 (1923).
Williams et al., J. Amer. Chem. Soc., 57, 1856–1876 (1935).

*Primary Examiner*—Won H. Louie
*Attorney, Agent, or Firm*—Carl O. Thomas

[57] ABSTRACT

Photographic silver halide emulsions are protected against latent image fading by aromatic latent image stabilizing compounds having the structure:

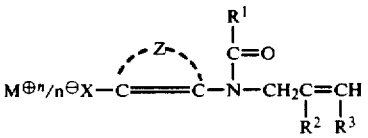

wherein:

$R^1$ is hydrogen, alkyl, or aryl;

$R^2$ and $R^3$ are each individually hydrogen, alkyl, alkoxy, carboxy, alkoxycarbonyl, or aminocarbonyl;

X is a middle chalcogen[;] *chosen from the class consisting of sulfur and selenium;*

Z represents the atoms completing an aromatic nucleus;

n is an integer of 1 or 2; and $M^{\oplus n}$ is a cation of valence n chosen from the group consisting of an onium ion, an ion from Group IA or IIA, and a metal ion from Group IIB, VIIB, IVA, or VA.

17 Claims, No Drawings

SILVER HALIDE EMULSIONS CONTAINING AROMATIC LATENT IMAGE STABILIZING COMPOUNDS

Matter enclosed in heavy brackets [ ] appears in the original patent but forms no part of this reissue specification; matter printed in italics indicates the additions made by reissue.

*This application is a reissue application for U.S. Pat. No. 4,423,140, based on U.S. Ser. No. 392,043, filed June 25, 1982, by Arthur H. Herz.*

FIELD OF THE INVENTION

This invention relates to photographic silver halide emulsions stabilized against latent image fading, to processes of preparing such emulsions and to photographic elements containing them.

BACKGROUND

A visible image is formed in silver halide photographic materials by exposure of the material to actinic radiation to form a record of the exposure which is invisible to the unaided eye, followed by processing of the material to yield a visible image.

The invisible record of exposure is referred to as a latent image. It is generally agreed that the latent image comprises minute specks of metallic silver formed in or on individual silver halide grains by interaction between silver ions and photoelectrons generated by absorption of actinic radiation by the silver halide grains.

Processing of most common silver halide photographic materials includes a development step in which the material is contacted with an aqueous alkaline solution of a developing agent. The developing agent is a reducing agent which will selectively reduce to metallic silver those silver halide grains containing a latent image.

It is known that the latent image is not permanent and that, with the passage of time, silver halide grains which would be developable immediately after exposure become nondevelopable. This phenomenon is termed latent image fading and manifests itself as a loss in image density in the developed image and a consequent loss in speed in the silver halide photographic material.

If silver halide materials were developed immediately following imagewise exposure, latent image fading would not be a problem. However, with many silver halide materials delays between exposure and processing frequently occur. For example, with amateur film materials in which multiple images are formed on a single roll of film there is often a delay of months between the time the first image is exposed and the time the exposed roll of film is sent for processing. With such materials latent image fading can present a significant problem and compounds are added to photographic materials to prevent or reduce it. These compounds are referred to as latent image stabilizing compounds or latent image stabilizers and the prevention or reduction of latent image fading is referred to as latent image stabilization.

Another way to which the developed image can be adversely affected is through a phenomenon known as fogging. Fogging is a result of spontaneous development of unexposed silver halide grains. The grains can be rendered developable during storage, either prior to or subsequent to exposure, or during development itself. In order to minimize this spontaneous development, compounds known as antifoggants are added to the silver halide material, to the developer solution, or to both.

Some compounds used as antifoggants are structurally similar to compounds used as latent image stabilizers. However, it is important to recognize that the two types of compounds are employed for different purposes to obtain different effects. Latent image fading is the loss of developable silver halide grains and results in a loss in density in the developed silver image, while fogging is the development of unexposed silver halide grains and results in an increase in minimum density. Thus, compounds which are known to be useful antifoggants are not necessarily useful as latent image stabilizers, and vice versa.

Among the latent image stabilizers known in the art are the N-alkenyl benzothiazolium and naphthothiazolium salts described in Arai et al. U.S. Pat. No. 3,954,478. In A. H. Herz U.S. Ser. No. 236,360, filed Feb. 20, 1981, now U.S. Pat. No. 4,374,196 commonly assigned, acyclic compounds (optionally containing an aryl substituent), which can be obtained by basic hydrolysis of N-alkenyl thiazolium salts, are disclosed to be effective latent image stabilizers.

DESCRIPTION OF THE INVENTION

In accordance with one embodiment of this invention there are provided novel latent image stabilizers represented by the structural formula: wherein:

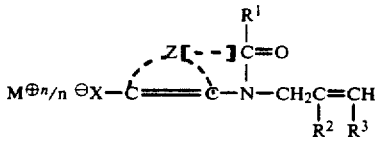

(I)

$R^1$ is hydrogen, alkyl, or aryl;

$R^2$ and $R^3$ are each individually hydrogen, alkyl, alkoxy, carboxy, alkoxycarbonyl, or aminocarbonyl;

X is a middle chalcogen *chosen from the class consisting of sulfur and selenium*;

Z represents the atoms completing an aromatic nucleus;

n is an integer of 1 or 2; and $M^{\oplus n}$ is a cation of valence n chosen from the group consisting of an onium ion, an ion from Group IA or IIA, and a metal ion from Group IIB, VIIB, IVA, or VA.

The alkyl groups and the alkyl portions of the akoxy, alkylcarbonyl and akkoxycarbonyl groups (and, unless otherwise stated, all other alkyl moieties identified below) preferably contain 1 to 8 carbon atoms (e.g., methyl, ethyl, propyl, butyl, amyl, hexyl, octyl), and most preferably contain 1 to 4 carbon atoms, and include unsubstituted and substituted groups. Useful substituents include halogen, cyano, aryl, carboxy, alkylcarbonyl, arylcarbonyl, alkoxycarbonyl, aryloxycarbonyl, and aminocarbonyl.

The aromatic nucleus completed by Z, the aryl groups, and the aryl portion of the arylcarbonyl and aryloxycarbonyl groups (and, unless otherwise stated, all other aryl moieties) preferably contain 6 to 10 ring carbon atoms (e.g., phenyl, naphthyl) and include substituted and unsubstituted groups. Useful substituents include halogen, cyano, alkyl, alkoxy, carboxy, alkylcarbonyl, arylcarbonyl, alkoxycarbonyl, aryloxycarbonyl, and aminocarbonyl.

The cations (M) of the present invention include organic and inorganic cations, such as an onium ion (e.g., ammonium, sulfonium, alkylammonium, arylammonium, alkylsulfonium, or arylsulfonium), an ion from Group IA of the Periodic Table (e.g., an alkali metal, such as lithium, sodium, or potassium), an alkaline earth metal ion from Group IIA of the Periodic Table (e.g., magnesium, calcium, or stronium) and a metal ion from Group IIB, VIIB, IVA, or VA of the Periodic Table (e.g., manganese, zinc, cadmium, lead, or bismuth). (The periodic table referred to herein is that shown on page 682 of Webster's Seventh New Collegiate Dictionary, G & C Merriam Company, Springfield, Mass., 1969.). The cation can be chosen to form highly soluble compounds or compounds which are only sparingly soluble (i.e., exhibiting a solubility product constant at 20° C. of less than $10^{-8}$ mole/liter). Sparingly soluble compounds can be advantageous when wandering of the compounds within the photographic element is desirably reduced.

The middle chalcogen (X) for Formula I is sulfur[,] *or* selenium[, or tellurium. That is, the]. *A* middle chalcogen is an element of a higher atomic number than oxygen and a lower atomic number than polonium found in Group VIA of the periodic table (specifically the periodic table referenced above). The term "middle chalcogen" is thus employed in its art recognized usage, as illustrated by Evans et al U.S. Pat. No. 4,035,185.

Another embodiment of this invention is a photographic silver halide emulsion containing a latent image stabilizing amount of a compound as described above.

Yet another embodiment of this invention is a photographic element comprising a support bearing a layer of a silver halide emulsion containing a latent image stabilizing amount of a compound as described above.

Still another embodiment of this invention is a process of stabilizing a photographic silver halide emulsion against fading of the silver halide latent image between imagewise exposure and development of a visible image, comprising adding to the emulsion a latent image stabilizing amount of compound as described above.

Particularly preferred compounds according to the present invention are those having the structural formula I above wherein:

$R^1$ is hydrogen or alkyl of 1 to 4 carbon atoms;

$R^2$ and $R^3$ are each hydrogen;

Z represents the moiety

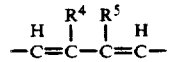

completing an aromatic nucleus; and $R^4$ and $R^5$ are each individually hydrogen, cyano, halogen, or alkyl or alkoxy of 1 to 4 carbon atoms;

X is sulfur; and

M is $Li^+$, $Na^+$, $K^+$, $Zn^{++}$, $Cd^{++}$, $Pb^{++}$, $Mn^{++}$, $Ca^{++}$, $Mg^{++}$, $Sr^{++}$, or $Bi^{++}$ ion.

Exemplary preferred compounds according to the present invention are tabulated below:

TABLE I

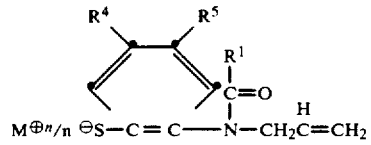

(II)

| No. | $M^{\oplus n}$ | $R^1$ | $R^4$ | $R^5$ |
|---|---|---|---|---|
| 1 | $\frac{1}{2}Pb^{++}$ | H | H | H |
| 2 | $\frac{1}{2}Zn^{++}$ | H | H | H |
| 3 | $\frac{1}{2}Cd^{++}$ | H | H | H |
| 4 | $\frac{1}{2}Pb^{++}$ | H | $-CH_3$ | $-CH_3$ |
| 5 | $\frac{1}{2}Zn^{++}$ | H | $-CN$ | $-CN$ |
| 6 | $\frac{1}{2}Cd^{++}$ | H | $-OCH_3$ | $-OCH_3$ |
| 7 | $\frac{1}{2}Pb^{++}$ | $-CH_3$ | $-OCH_3$ | $-OCH_3$ |
| 8 | $\frac{1}{2}Zn^{++}$ | $-CH_3$ | H | H |
| 9 | $\frac{1}{2}Cd^{++}$ | H | Br | H |
| 10 | $\frac{1}{2}Ca^{++}$ | H | H | H |
| 11 | $\frac{1}{2}Mg^{++}$ | H | $-OCH_3$ | $-OCH_3$ |
| 12 | $Na^+$ | $-CH_3$ | $-OCH_3$ | $-OCH_3$ |

Compounds of the present invention can be prepared by hydrolyzing the corresponding N-alkenyl aromatic thiazolium salt in an aqueous or dilute gelatin solution using an appropriate base, such as sodium hydroxide, and, if necessary, performing a cation exchange reaction using an aqueous solution of a suitable salt, such as a nitrate, of the desired cation. These procedures are analogous to those reported by W. H. Mills, et al., J. Chem. Soc., 123,2353 (1923) and R. R. Williams and A. E. Ruehle, J. Amer. Chem. Soc., 57, 1856-76 (1935).

The N-alkenyl aromatic thiazolium salts can be prepared by reacting the corresponding aromatic thiazole with an appropriate alkenyl halide.

The silver halide emulsions employed in the present invention can be any of the silver halide emulsions known in the art which are desirably protected against latent image fading. The silver halide emulsions can be comprised of silver bromide, silver chloride, silver chlorobromide, silver chloroiodide, silver bromoiodide, silver chlorobromoiodide or mixtures thereof. The emulsions can include coarse, medium or fine grain silver halide grains and can be monodisperse or polydisperse.

The silver halide emulsions are preferably negative-working emulsions. They can be chemically sensitized with active gelatin, as illustrated by T. H. James, The Theory of the Photographic Process, 4th Ed., Macmillan, 1977, pp. 67-76, or with sulfur, selenium, tellurium, gold, platinum, palladium, iridium, osmium, rhenium or phosphorus sensitizers or combinations of these sensitizers, such as at pAg levels of from 5 to 10, pH levels of from 5 to 8 and temperatures of from 30° to 80° C., as illustrated by Research Disclosure, Vol 134, June 1975, Item 13452, Sheppard et al U.S. Pat. No. 1,623,499, Matthies et al U.S. Pat. No. 1,673,522, Waller et al U.S. Pat. No. 2,399,083, Damschroder et al U.S. Pat. No. 2,642,361, McVeigh U.S. Pat. No. 3,297,447, Dunn U.S. Pat. No. 3,297,446, McBride U.K. Pat. No. 1,315,755, Berry et al U.S. Pat. No. 3,772,031, Gilman et al U.S. Pat. No. 3,761,267, Ohi et al U.S. Pat. No. 3,857,711, Klinger et al U.S. Pat. No. 3,565,633, Oftedahl U.S. Pat. Nos. 3,901,714 and 3,904,415 and Simons U.K. Pat. No. 1,396,696; chemical sensitization being optionally conducted in the presence of thiocyanate derivatives, as described in Neitz et al U.S. Pat. No. 2,222,264, Damschroder U.S. Pat. No. 2,642,361; thioether compounds, as disclosed in Lowe et al U.S. Pat. No.

2,521,926, Williams et al U.S. Pat. No. 3,021,215 and Bigelow U.S. Pat. No. 4,054,457 and azaindenes, azapyridazines and azapyrimidines, as described in Dostes U.S. Pat. No. 3,411,914, Kuwabara et al U.S. Pat. No. 3,554,757, Oguchi et al U.S. Pat. No. 3,565,631 and Oftedahl U.S. Pat. No. 3,901,714. Additionally or alternatively, the emulsions can be reduction sensitized e.g., with hydrogen, as illustrated by Janusonis U.S. Pat. No. 3,891,446 and Babcock et al U.S. Pat. No. 3,984,249, by low pAg (e.g., less than 5) high pH (e.g.,- greater than 8) treatment or through the use of reducing agents, such as stannous chloride, thiourea dioxide, polyamines and amineboranes, as illustrated by Allen et al U.S. Pat. No. 2,983,609, Oftedahl et al Research Disclosure, Vol. 136, August 1975, Item 13654, Lowe et al U.S. Pat. Nos. 2,518,696 and 2,739,060, Roberts et al U.S. Pat. Nos. 2,743,182 and '183, Chambers et al U.S. Pat. No. 3,026,203 and Bigelow et al U.S. Pat. No. 3,361,564. (Research Disclosure is published by Industrial Opportunities Ltd., Homewell, Havant Hampshire, P09 1EF, United Kingdom).

The silver halide emulsions can be spectrally sensitized with dyes from a variety of classes, including the polymethine dye class, which includes the cyanines, merocyanines, complex cyanines and merocyanines (i.e., tri-, tetra-, and poly-nuclear cyanines and merocyanines), oxonols, hemioxonols, styryls, merostyryls and streptocyanines. Particularly useful dyes are benzoxazole, benzimidazole and benzothiazole carbocyanine dyes.

The photographic silver halide emulsions can contain various colloids alone or in combination as vehicles. Suitable hydrophilic material include both naturally occurring substances such as proteins, protein derivatives, cellulose derivatives e.g., cellulose esters, gelatin e.g., alkali-treated gelatin (cattle, bone or hide gelatin) or acid-treated gelatin (pigskin gelatin), gelatin derivatives e.g. acetylated gelatin, phthalated gelatin and the like, polysaccharides such as dextran, gum arabic, zein, casein, pectin, collagen derivatives, collodion, agar-agar, arrowroot, albumin and the like. The vehicles can be hardened by conventional procedures. Further details of the vehicles and hardeners are provided in Research Disclosure, December 1978, Item 17643, Sections IX and X.

The latent image stabilizing compound can be added to the silver halide emulsion at any point subsequent to precipitation of the silver halide grains so that it will interact with the silver halide grains prior to exposure of the emulsion. Preferably, the latent image stabilizing compound is added to the emulsion after chemical and spectral sensitization, but prior to coating. However, it can be present during these sensitization processes.

The optimum amount of latent imge stabilizing compound added to the emulsion will depend upon such factors as the particular latent image stabilizing compound, the particular silver halide emulsion, the location of latent image formation, the nature of other components of the emulsion, and the like. Useful amounts are generally within the range 0.005 to 100 millimoles (hereinafter also designated mmoles) of latent image stabilizer per mole of silver. Preferably, the latent image stabilizing compound is incorporated in the emulsion in an amount of 0.05 to 10 millimoles of latent image stabilizer per mole of silver.

The photographic silver halide emulsions of this invention and photographic elements employing them can contain other addenda conventional in the photographic art. Useful addenda are described, for example, in Research Disclosure, December 1978, Item 17643. Useful addenda include spectral sensitizing dyes and desensitizers, antifoggants, couplers (such as dye-forming couplers, masking couplers and DIR couplers) DIR compounds, anti-stain agents, image dye stabilizers, absorbing materials such as filter dyes and UV absorbers, light scattering materials, coating aids, plasticizers and lubricants, and the like.

The photographic elements of the present invention can be simple black-and-white or monochrome elements comprising a support bearing a layer of the silver halide emulsion, or they can be multilayer and/or multicolor elements. They can be designed for processing with separate solution or for in camera processing. Multicolor elements contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In an alternative format, the emulsion or emulsions can be disposed as one or more segmented layers, e.g., as by the use of microvessels or microcells, as described in Whitmore U.S. patent application Ser. No. 184,714 filed Sept. 9, 1980[.], *now U.S. Pat. No. 4,362,806.*

A preferred color photographic element according to this invention comprises a support bearing at least one blue-sensitive silver halide emulsion layer having associated therewith a yellow dye-forming coupler, at least one green-sensitive silver halide emulsion layer having associated therewith a magenta dye-forming coupler and at least one red-sensitive silver halide emulsion layer having associated therewith a cyan dye-forming coupler, at least one of the silver halide emulsion layers containing a latent image stabilizing compound of this invention. In accordance with a particularly preferred aspect of the present invention, the latent image stabilizing compound is contained in a yellow dye-forming blue-sensitive silver halide emulsion.

The elements of the present invention can contain additional layers conventional in photographic elements, such as overcoat layers, spacer layers, filter layers, antihalation layers, scavenger layers and the like. The support can be any suitable support used with photographic elements. Typical supports include polymeric films, paper (including polymer-coated paper), glass and the like. Details regarding supports and other layers of the photographic elements of this invention are contained in Research Disclosure, December 1978, Item 17643, referred to above, the disclosure of which is incorporated herein by reference.

The following examples further illustrate this invention.

PREPARATION OF COMPOUND 1

The mercaptide of the following structure was prepared:

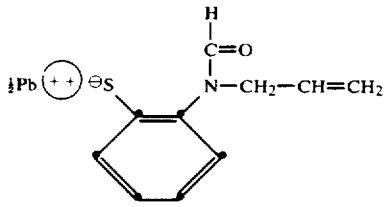

(Compound 1)

3-Allylbenzothiazolium tosylate (347 mg, 1 millimole) was dissolved in a 1% aqueous gelatin solution (270 g) at pH 4.9. Aqueous sodium hydroxide solution (2 millimoles, 0.25 m) was added (pH 6.4). An aqueous lead nitrate solution (165.6 mg, 0.5 millimole) was added to give a cloudy, yellowish dispersion. The pH was adjusted to 6.0 prior to use as a latent image stabilizer addendum.

PREPARATION OF COMPOUND 2

Compound 2 was prepared similarly as Compound 1, except that a source of $Zn^{++}$ ions was substituted for the source of $Pb^{++}$ ions.

PREPARATION OF COMPOUND 3

Compound 3 was prepared similarly as Compound 1, except that a source of $Cd^{++}$ ions was substituted for the source of $Pb^{++}$ ions.

PREPARATION OF COMPOUND 12

The mercaptide of the following structure was prepared.

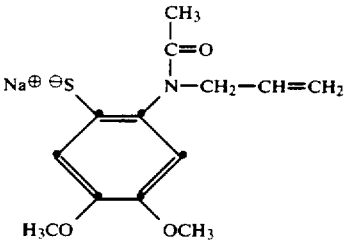

(Compound 12)

3-Allyl-5,6-dimethoxy-2-methylbenzothiazolium hexafluorophosphate (50 mg, 0.126 millimole) was dissolved in methyl alcohol (24 ml) and treated with a 2 molar equivalent of aqueous sodium hydroxide (1 ml, 0.25 m) to obtain Compound 12.

PREPARATION OF COMPOUND 7

Compound 7 was prepared similarly as Compound 12, but $Pb^{++}$ ions were substituted for $Na^{+}$ ions by an ion-exchange procedure.

EXAMPLES 1-3

A series of photographic silver halide coatings were prepared as follows:

A nonspectrally sensitized, sulfur and gold-sensitized, 0.8 μm silver bromide emulsion at a pH of approximately 5.0 and pAg of 9.0 was prepared. To individual portions of the emulsion were added compounds as indicated in Table II, which follows. The individual emulsions were then coated on a poly(ethylene terephthalate) film support at a coverage of 5.81 grams silver per square meter and 13.2 grams gelatin per square meter. After drying, individual portions of each of the coatings were tested using three different procedures as follows:

A. Exposed through a step inlet for 1/25 second to a 500 watt, 2850° K. tungsten light and immediately processed for 6 minutes in a p-methylaminophenol sulfatehydroquinone developer, fixed, washed and dried.

B. Stored for one week at 48.9° C. and 50% relative humidity and then exposed and processed as in (A).

C. Exposed as in (A), stored for one week as in (B) and then processed as in (A).

The relative speeds obtained with the coatings using each of the three procedures are shown in Table II, which follows. Procedure (C) shows the effect of latent image fading relative to both procedures (A) and (B). The greater the loss of relative speed, the greater the amount of latent image fading.

TABLE II

| Coating | Compound | (mmoles/mole Ag) | Relative Speed A | B | C |
|---|---|---|---|---|---|
| 1 (control) | none | none | 100 | 316 | 100 |
| 2 (Example 1) | 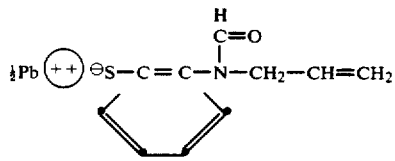 | 3 | 69 | 110 | 151 |
| 3 (Example 2) | 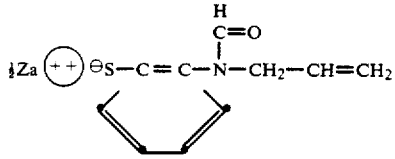 | 3 | 78 | 112 | 178 |

TABLE II-continued

| Coating | Compound | (mmoles/mole Ag) | Relative Speed A | B | C |
|---|---|---|---|---|---|
| 4 (Example 3) | 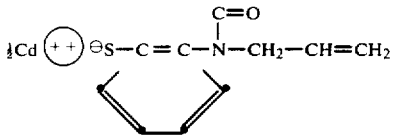 | 3 | 100 | 145 | 182 |
| 5 (comparison) | $Pb(NO_3)_2$ | 1.5 | 83 | 295 | 83 |
| 6 (comparison) | $Zn(NO_3)_2$ | 1.5 | 94 | 27.5 | 94 |
| 7 (comparison) | $Cd(NO_3)_2$ | 1.5 | 94 | 24 | 115 |

The data show that the coatings containing latent image stabilizers according to the present invention exhibit higher relative speeds than the control coating to which no latent image stabilizer was added. Coatings 5, 6 and 7 demonstrate that the improvement in latent image stabilization achieved can not be attributed merely to the presence of the divalent metal ion. The addition of lead and zinc ions absent the organic moiety of latent image stabilizers of this invention resulted in a loss of speed as compared to the control when exposure is delayed one week. The similar coating employing cadmium ion resulted in less of a speed increase as compared to the control than achieved with the latent image stabilizers of the present invention.

EXAMPLES 4 and 5

A series of coatings were prepared and evaluated similarly as in Examples 1 through 3. The results again show that latent image stabilizers according to the present invention produce higher speed in coatings processed one week after exposure as compared to the control coating lacking any latent image stabilizer addenda. A further comparison is provided with an analogous benzothiazole and with a corresponding silver salt. The latent image stabilizers of the invention are shown to produce higher speeds than the corresponding benzothiazole. The results are summarized below in Table III.

TABLE III

| Coating | Compound | (mmoles/mole Ag) | Relative Speed A | B | C |
|---|---|---|---|---|---|
| 8 (control) | none | none | 100 | 209 | 52 |
| 9 (comparison) | 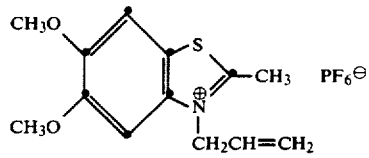 | 3 | 78 | 97 | 35 |
| 10 (Example 4) | 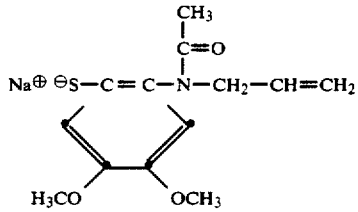 | 3 | 82 | 100 | 78 |
| 11 (Example 5) | 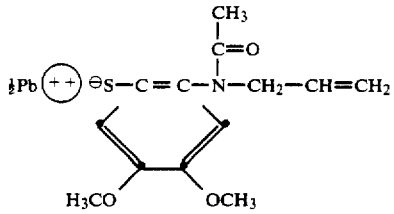 | 3 | 82 | 110 | 65 |

TABLE III-continued

| Coating | Compound | (mmoles/mole Ag) | Relative Speed A | B | C |
|---|---|---|---|---|---|
| 12 (comparison) | 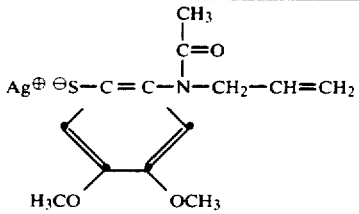 | 3 | 80 | 71 | 45 |

EXAMPLE 6

A series of coatings were prepared and evaluated similarly as in Examples 1 through 3. The results again show that the latent image stabilizer according to the present invention produces higher speed in a coating processed one week after exposure as compared to the control coating lacking any latent image stabilizer. Further comparisons with an analogous benzoxazole and an analogue of the latent image stabilizer in which oxygen replaces selenium shows the latent image stabilizer of the invention to produce a higher speed. The results are summarized below in Table IV.

TABLE IV

| Coating | Compound | (mmoles/mole Ag) | Relative Speed A | B | C |
|---|---|---|---|---|---|
| 13 (control) | none | none | 100 | 276 | 50 |
| 14 (comparison) | 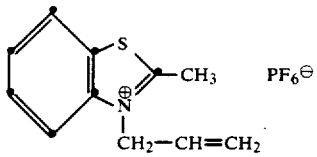 | 3 | 120 | 145 | 100 |
| 15 (comparison) | 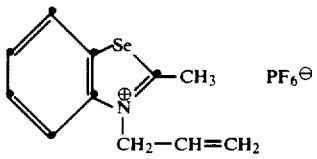 | 3 | 85 | 115 | 87 |
| 16 (Example 6) | 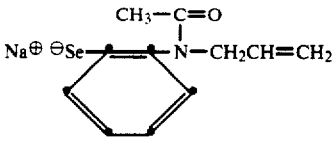 | 3 | 89 | 100 | 107 |
| 17 (comparison) | 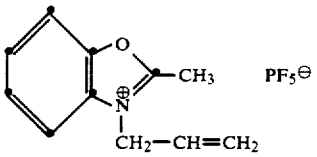 | 3 | 91 | 269 | 49 |
| 18 (comparison) | 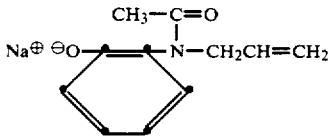 | 3 | 82 | 42 | 41 |

This invention has been described in detail with particular reference to preferred embodiments thereof but it will be understood that variations and modifications can be effected within the spirit and scope of the invention.

What is claimed is:

1. A photographic silver halide emulsion containing a latent image stabilizing amount of a compound represented by the formula:

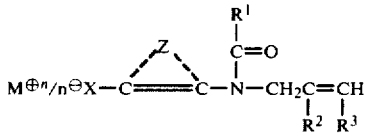

wherein:

$R^1$ is hydrogen, alkyl, or aryl;

$R^2$ and $R^3$ are each individually hydrogen, alkyl, alkoxy, carboxy, alkoxycarbonyl, or aminocarbonyl;

X is a middle chalcogen *chosen from the class consisting of sulfur and selenium*;

Z represents the atoms completing an aryl aromatic nucleus;

n is an integer of 1 or 2; and $M^{\oplus n}$ is a cation of valence n chosen from the group consisting of an onium ion, an ion from group IA or IIA, and a metal ion from Group IIB, VIIB, IVA, or VA.

2. A photographic silver halide emulsion according to claim 1 wherein aryl consists of from 6 to 10 ring carbon atoms and alkyl consists of from 1 to 8 carbon atoms.

3. A photographic silver halide emulsion containing a latent image-stabilizing amount of a compound represented by the formula:

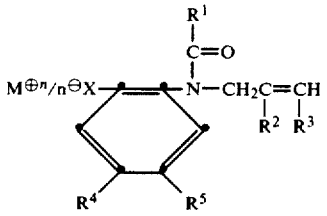

wherein:

$R^1$ is hydrogen, alkyl, or phenyl;

$R^2$ and $R^3$ are each individually hydrogen, alkyl, alkoxy, carboxy, alkoxycarbonyl, or aminocarbonyl;

$R^4$ and $R^5$ are each individually hydrogen, alkyl, alkoxy, phenyl, cyano, halogen, carboxy, alkylcarbonyl, phenylcarbonyl, alkoxycarbonyl, phenoxycarbonyl, or aminocarbonyl;

X is a middle chalcogen *chosen from the class consisting of sulfur and selenium*;

n is an integer of 1 or 2; and $M^{\oplus n}$ is a metal cation chosen from Group IA, IIA, IIB, VIIB, IVA, and VA;

alkyl in each occurrence including from 1 to 8 carbon atoms.

4. A photographic silver halide emulsion of claim 3 wherein:

$R^1$ is hydrogen or alkyl of 1 to 4 carbon atoms;

$R^2$ and $R^3$ are each hydrogen;

$R^4$ and $R^5$ are each individually hydrogen or alkyloxy or alkyl of 1 to 4 carbon atoms; and $M^{+n}$ is a divalent metal cation.

5. A photographic silver halide emulsion of claim 3 wherein the latent image stabilizing compound is represented by the structural formula:

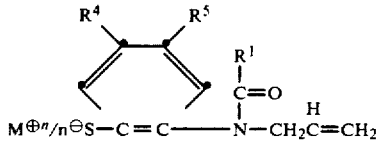

wherein:

$R^1$ is hydrogen or methyl;

$R^4$ and $R^5$ are individually hydrogen, methyl, or methoxy;

n is an integer of 1 or 2; and $M^{\oplus}$ is a cation chosen from the group consisting of lithium, sodium, potassium, magnesium, calcium, strontium, manganese, zinc, cadmium, lead, and bismuth.

6. A photographic silver halide emulsion of claim 1, 3, or 5 wherein the latent image stabilizing compound is present in an amount of from 0.005 to 100 millimoles per mole of silver.

7. A photographic element comprising a support bearing a layer of a silver halide emulsion of any one of claims 1, 3 or 5.

8. A photographic element of claim 7 wherein the latent image stabilizing compound is present in an amount of from 0.005 to 100 millimoles per mole of silver.

9. A photographic element of claim 7 wherein the latent image stabilizing compound is present in an amount of from 0.05 to 10 millimoles per mole of silver.

10. In a color photographic element comprising a support bearing at least one blue-sensitive silver halide emulsion layer having associated therewith a yellow dye-forming coupler, at least one green-sensitive silver halide emulsion layer having associated therewith a magenta dye-forming coupler, and at least one red-sensitive silver halide emulsion layer having associated therewith a cyan dye-forming coupler, the improvement wherein at least one of the silver halide emulsion layers contains a latent image stabilizing amount of a compound represented by the formula:

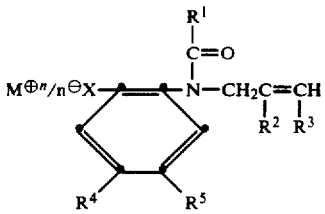

wherein:

$R^1$ is hydrogen, alkyl, or phenyl;

$R^2$ and $R^3$ are each individually hydrogen, alkyl, alkoxy, carboxy, alkoxycarbonyl, or aminocarbonyl;

$R^4$ and $R^5$ are each individually hydrogen, alkyl, alkoxy, phenyl, cyano, halogen, carboxy, alkylcarbonyl, phenylcarbonyl, alkoxycarbonyl, phenoxycarbonyl or aminocarbonyl;

X is a middle chalcogen *chosen from the class consisting of sulfur and selenium*;

n is an integer of 1 or 2;

$M^{\oplus n}$ is a metal cation chosen from Group IA, IIA, IIB, VIIB, IVA, and VA; and alkyl in each occurrence including from 1 to 8 carbon atoms.

11. A color photographic element of claim 10 wherein:

$R^1$ is hydrogen or alkyl of 1 to 4 carbon atoms;

$R^2$ and $R^3$ are each hydrogen; and $R^4$ and $R^5$ are each individually hydrogen and alkoxy or alkyl of 1 to 4 carbon atoms.

12. In a color photographic element of claim 10 wherein the latent image stabilizing compound is represented by the structural formula:

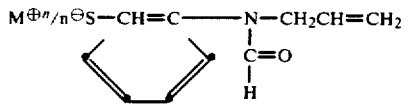

wherein:

$M^{\oplus 2}/2$ is a lead, zinc, or cadmium cation.

13. A color photographic element of any one of claims 10, 11 or 12 wherein the latent image stabilizing compound is contained in a blue-sensitive silver halide emulsion layer.

14. A color photographic element of any one of claims 10, 11 or 12 wherein the latent image stabilizing compound is present in an amount of from 0.05 to 10 millimoles per mole of silver.

15. A process of stabilizing a photographic silver halide emulsion against fading of the silver halide latent image between imagewise exposure and development of a visible image, comprising adding to the emulsion prior to exposure a latent image stabilizing amount of a compound represented by the formula:

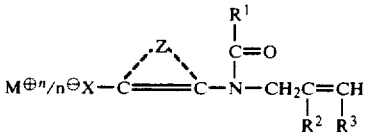

wherein:

$R^1$ is hydrogen, alkyl, or aryl;

$R^2$ and $R^3$ are each individually hydrogen, alkyl, alkoxy, carboxy, alkoxycarbonyl, or aminocarbonyl;

X is a middle chalcogen *chosen from the class consisting of sulfur and selenium*;

Z represents the atoms completing an aryl aromatic nucleus;

n is an integer of 1 or 2; and $M^{\oplus n}$ is a cation of valence n, chosen from the group consisting of an onium ion, an ion from Group IA or IIA, and a metal ion from Group IIB, VIIB, IVA, or VA.

16. A process of claim 15 wherein the latent image stabilizing compound is added to the emulsion prior to coating in an amount of from 0.005 to 100 millimoles per mole of silver.

17. A process of claim 15 wherein the latent image stabilizing compound is added following chemical and spectral sensitization.

* * * * *